Feb. 25, 1936.  A. MEHNERT  2,032,295
TIRE SPREADING MACHINE
Original Filed June 8, 1934
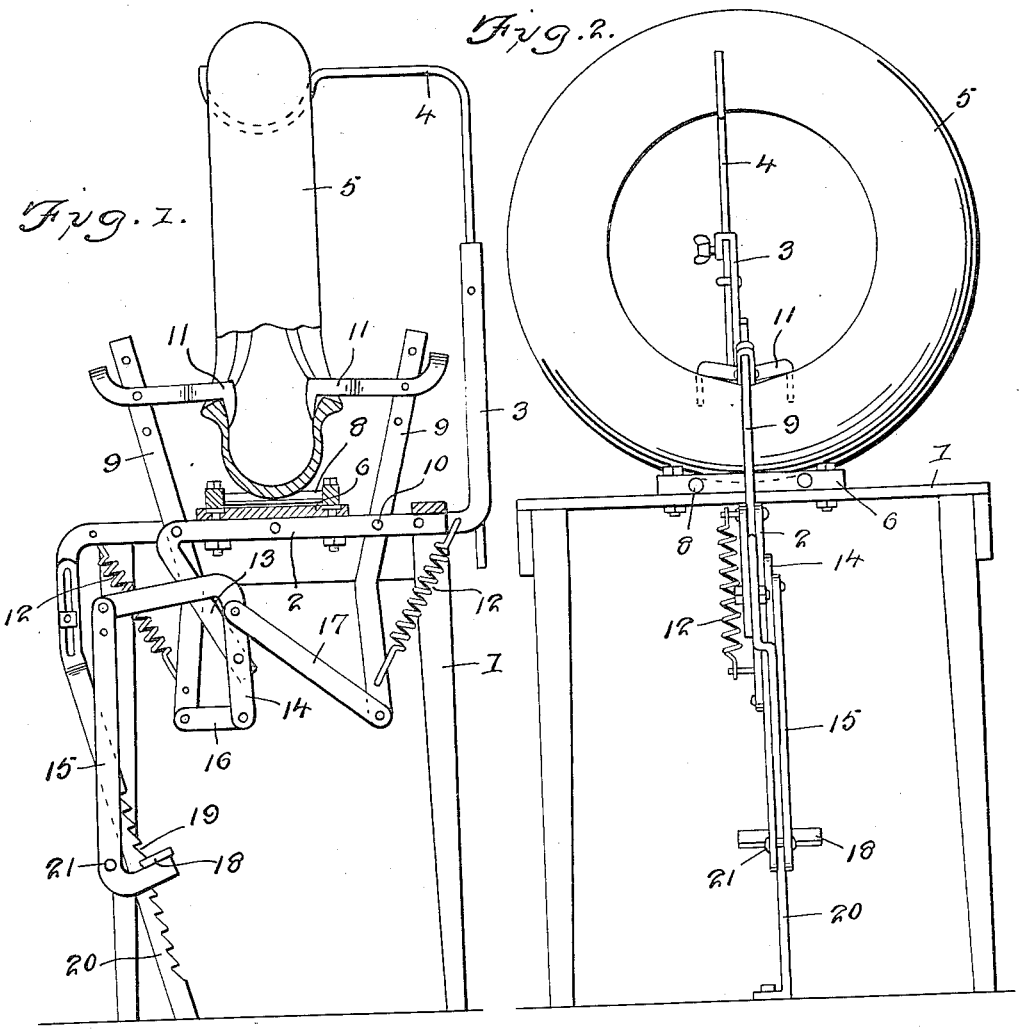
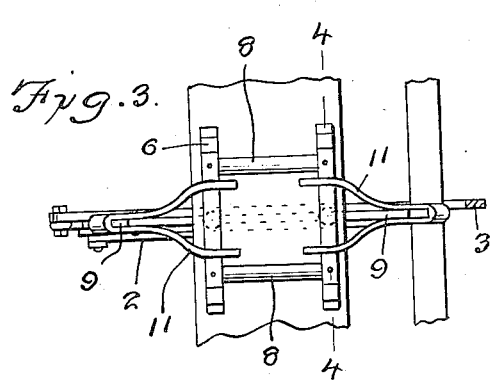
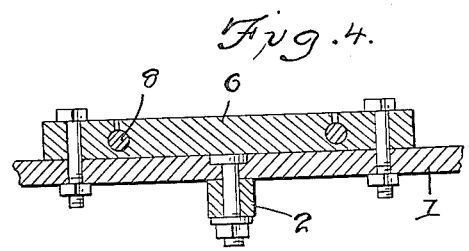
Alfred Mehnert
INVENTOR
BY Victor J. Evans & Co.
ATTORNEY Patented Feb. 25, 1936

2,032,295

UNITED STATES PATENT OFFICE 2,032,295

TIRE SPREADING MACHINE

Alfred Mehnert, Boscobel, Wis.

Application June 8, 1934, Serial No. 729,711
Renewed June 26, 1935

2 Claims. (Cl. 154—9)

This invention relates to tire spreading machines and has for the primary object the provision of a device of the above stated character which is constructed to permit a tire to be easily and quickly installed thereon and spread at any portion thereof to permit thorough inspection of the interior of the tire by a person or for positioning the tire so that repairs may be easily made to the interior thereof.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a sectional view illustrating a tire spreading machine constructed in accordance with this invention.

Figure 2 is a front elevation illustrating the same.

Figure 3 is a fragmentary plan view showing the jaws for the spreading of the tire.

Figure 4 is a detail sectional view taken on the line 4—4 of Figure 3.

Referring in detail to the drawing, the numeral 1 indicates a bench or support to which is secured a horizontally arranged member 2 and extending upwardly from one end of said member 2 is a post 3 having adjustably secured thereto a tire supporting rack or arm 4 positioned to overlie the support 1 and on which may be placed a tire 5. A bed 6 is mounted to the support 1 and carries rollers 8 on which the tire 5 is adapted to rest. Extending above and below the member 2 and arranged at opposite sides of the bed 6 are levers 9 having pivotal connection to the member 2, as shown at 10. The upper portions of the levers are provided with a series of openings to permit jaws 11 to be adjustably connected to said levers. The jaws extend in the direction of each other to engage the beads of the tire 5, as clearly shown in Figure 1. The lower portions of the levers 9 are angularly disposed and have connected thereto coil springs 12 which are in turn connected to the member 2 and act to move or urge the jaws 11 towards each other.

A bracket 13 depends from the member 2 and has pivoted thereto a substantially L-shaped arm 14, one end of which has pivoted thereto an operating lever 15 and the other end is pivotally connected to one of the levers 9 by a link 16 and the other lever 9 is pivotally connected to said arm 14 by a link 17. The pivotal connection of the link 17 to the arm 14 is above the latter's pivot while the link 16 is pivoted to the arm 14 below its pivot. The operating lever 15 depends downwardly and carries a foot piece 18 angularly disposed thereto and which is adapted to engage any one of a series of teeth 19 formed on a rack bar 20, one end of which is fixed and the other end adjustably connected to one end of the member 2. The operating lever 15 consists of spaced members which straddle the rack bar 20 and are connected by a pin 21 engageable with a face of the rack bar opposite to the location of the teeth 19, which are engaged by the foot piece 18.

A downward movement of the operating lever 15 will bring about the spreading of the tire 5 by the jaws 11, as shown in Figure 1, and by bringing the foot piece 18 in engagement with one of the teeth of the rack bar the tire will be maintained in a spread condition so that the operator is free to examine the interior of the tire with both hands. The disengagement of the foot piece 18 and the release of pressure on the lever 15 will permit the springs 12 to urge the jaws towards each other and thereby permit collapsing of the tire or the return of said tire to its original shape.

The rollers 8 on the bed 6 permit turning or movement of the tire easily upon the support 4.

Having described the invention, I claim:

1. A tire spreading machine comprising a bench, a horizontally arranged member secured to the bench, tire supporting means carried by said member, levers pivoted to said member and extending above and below the latter, jaws to engage opposite walls of the tire adjustably connected to said levers, springs between the levers and the member for urging the jaws towards each other, a rack bar carried by said member, an operating lever associated with the rack bar, a bracket carried by said member, an L-shaped arm pivoted to said bracket, links pivotally connecting the arm to said first-named levers, and a pivotal connection between the operating lever and said arm.

2. A tire spreading machine comprising a bench, a horizontally arranged member secured to the bench, tire supporting means carried by said member, levers pivoted to said member and extending above and below the latter, jaws to engage opposite walls of the tire adjustably connected to said levers, springs between the levers and the member for urging the jaws towards each other, a rack bar carried by said member, an operating lever associated with the rack bar, a bracket carried by said member, an L-shaped arm pivoted to said bracket, links pivotally connecting the arm to said first-named levers, and a pivotal connection between the operating lever and said arm, a bed carried by said bench, and rollers carried by said bed to engage with the tire carried by the tire supporting means.

ALFRED MEHNERT.